June 29, 1965 W. B. McCAIN ET AL 3,191,925
SIGNATURE MACHINES
Filed Dec. 17, 1962 9 Sheets-Sheet 4

Inventors
WILLIAM B. McCAIN
JAMES F. COSGROVE
By Wallace, Kinzer and Dorn
Attorneys June 29, 1965 W. B. McCAIN ET AL 3,191,925
SIGNATURE MACHINES
Filed Dec. 17, 1962 9 Sheets-Sheet 5

Inventors
WILLIAM B. McCAIN
JAMES F. COSGROVE
By Wallace, Kinzer and Dorn
Attorneys

Inventors
William B. McCain
James F. Cosgrove
By Wallace, Kinzer and Dorn
Attorneys United States Patent Office 3,191,925
Patented June 29, 1965

3,191,925
SIGNATURE MACHINES
William B. McCain, Hinsdale, and James F. Cosgrove, Western Springs, Ill., assignors to Chicago Machinery Laboratory, Inc., Chicago, Ill., a corporation of Illinois
Filed Dec. 17, 1962, Ser. No. 245,322
11 Claims. (Cl. 270—56)

This application is a continuation-in-part of our copending application Serial No. 100,347, filed April 3, 1961, now abandoned.

This invention relates to a signature machine in which books are formed from individual juxtaposed signatures, and in particular to calipering apparatus and related controls that are effective to control operations on the signature groups moving through the machine.

In a signature machine of the kind under consideration, individual signatures in folded form are advanced from hoppers and dropped onto a saddle under circumstances where one signature is gathered atop another on the saddle to afford a signature group. Thereafter, the signature groups are advanced to a stitching station where staplers or the like are effective to join the signatures to complete a book.

It is known to associated calipering apparatus in such a signature machine to caliper the signature groups prior to stitching to determine if the signature group includes the correct number of pages. Thus, the calipering apparatus is intended to measure the thickness of the signature group to determine if a signature is missing or if too many signatures are present, or in other words if the signature group moving therepast is on the too thick or too thin side of correct book thickness. If there is a departure from correct book thickness, means are then operated to control subsequent operations in the machine.

Caliper devices as heretofore proposed have in many instances been so constructed as to be merely capable of detecting whether or not a signature group is actually moving through the machine in the proper spaced sequence. Caliper devices of this kind are not capable of detecting a missing page or an excessive number of pages. In other instances, calipering devices as heretofore proposed have been of quite complicated and expensive construction, and because of this malfunctions occur and in particular a great deal of backlash is likely to be encountered or must be compensated for because of numerous moving parts.

In view of the foregoing, the primary object of the present invention is to construct caliper apparatus for a signature machine to be capable of calipering within a single page on either side of correct book thickness and under circumstances where the likelihood of distortions such as backlash or the like are reduced to a minimum.

Spsecifically, an object of the present invention in this regard is to construct calipering apparatus of the foregoing kind to be inclusive of a calipering cam and an opposed oscillating member which is freed during a calipering interval of the cam to oscillate to an extent determined by the thickness of the signature group being calipered. Yet further, the oscillating roller is in effect cantilevered on an oscillating shaft and a separate control arm is secured to the shaft for oscillation therewith. The control arm is a multiple of the length of the arm which cantilevers the opposed member on the oscillating shaft, so that small moments in the oscillating shaft are multiplied at the free end of the control arm where control switches are located. Thus, under and in accordance with the present invention, caliper movements are multiplied in a relatively simple manner so that large movements of the control arm will occur in those instances where the signature group being calipered departs from correct book thickness, even though the departure may be but a single page. Such multiplication enables relatively rugged control switches to be used in the machine that are insensitive to anything but a significant movement of the control arm. This eliminates false signals or wrong information, and such is another object of the present invention.

Yet further, the components of the caliper apparatus are ruggedly constructed and supported as will hereinafter be described, and this coupled with the relatively few parts involved and the multiplying effect above referred to virtually eliminates distortions or backlash that might otherwise result in wrong information during calipering. Such constitutes another object of the present invention.

The machine of the present invention is one wherein the saddle along which the signature groups move is inclusive of an inclined saddle plate. As will hereinafter be described, the calipering cam and the opposed member are carried on shafts that are disposed parallel to the saddle plate on opposite sides of a notch or opening in the plate over which the signature group to be calipered moves. The calipering cam and the opposed member, during a calipering interval, squeeze or contact the opposite sides of the signature group within the aforesaid opening. Signature groups can vary all the way from entertainment guides of relatively few pages and single make-up to quite thick arrangements that may include special inserts. In some instances, therefore, it is important to caliper certain kinds of signature groups near one edge. In other instances and with quite different signature groups, it is important to caliper at an altogether different area. Accordingly, another object of the present invention is to enable the calipering couple including the calipering cam and opposed member to be shifted in different runs of the machine to caliper at different areas relative to the aforesaid opening in the saddle past which the signature groups move.

The calipering cam is a rotative member and includes a calipering segment on a radius that will have a speed which will comply with the speed at which the signature groups move through the machine. It will be appreciated that machines of this kind are constructed to enable various feed rates to be established for the signature groups. Thus, the feed rate in one use of the machine may be such that the signature groups move through the machine, say at three per second, but in other instances a slower or faster rate may be advantageous. Under the present invention, and this constitutes another object, the shaft which carries the calipering cam is arranged for shifting movement toward or away from the plane of the aforesaid saddle plate, and this enables calipering cams of different sizes to be used so that the segment thereon will move at a circumferential speed corresponding to the lineal speed of the signature groups being calipered. Thus, variations in rates of signature group feed can be accommodated without the need to use change-speed gears or the like with the calipering apparatus under the present invention.

An aspect of the present construction is that if an imperfect book is detected by the calipering apparatus, the stitching mechanism is to be rendered ineffective to form a book therefrom. Heretofore it has been proposed to accomplish this by interrupting the drive that is used to reciprocate staplers or other stitching means at the stitching station, and another object of the present invention is to render the stitching mechanism more effective to form a book more efficiently than heretofore proposed.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

*General description*

Figure 1:
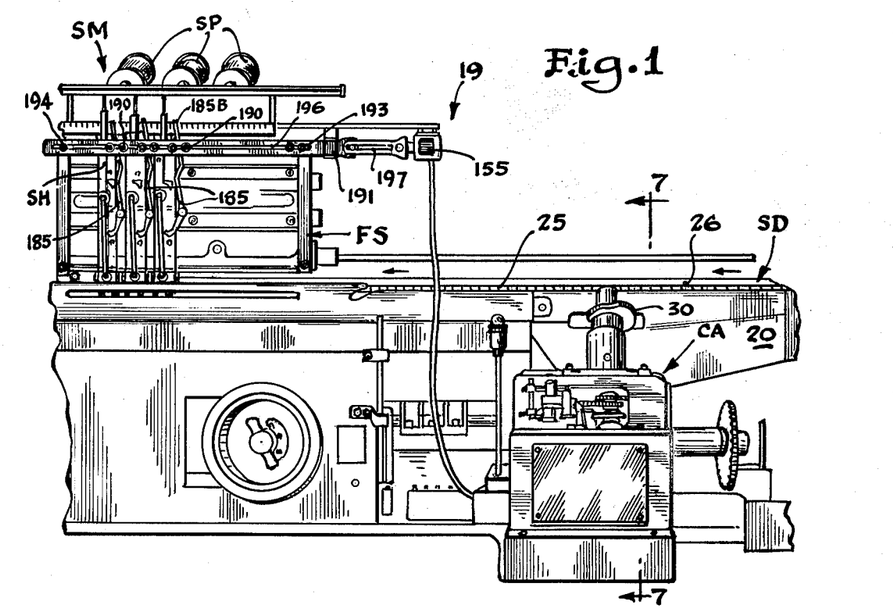
FIG. 1 is a perspective view of a portion of a machine constructed in accordance with the present invention.
Figure 2:
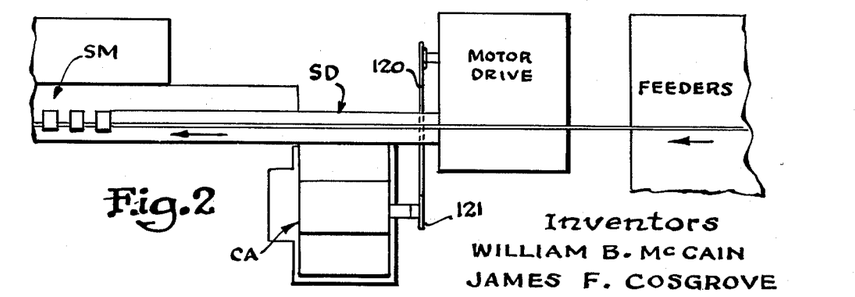
FIG. 2 is a diagrammatic view illustrating various stations in the machine.
Figures 7, 8, 9:
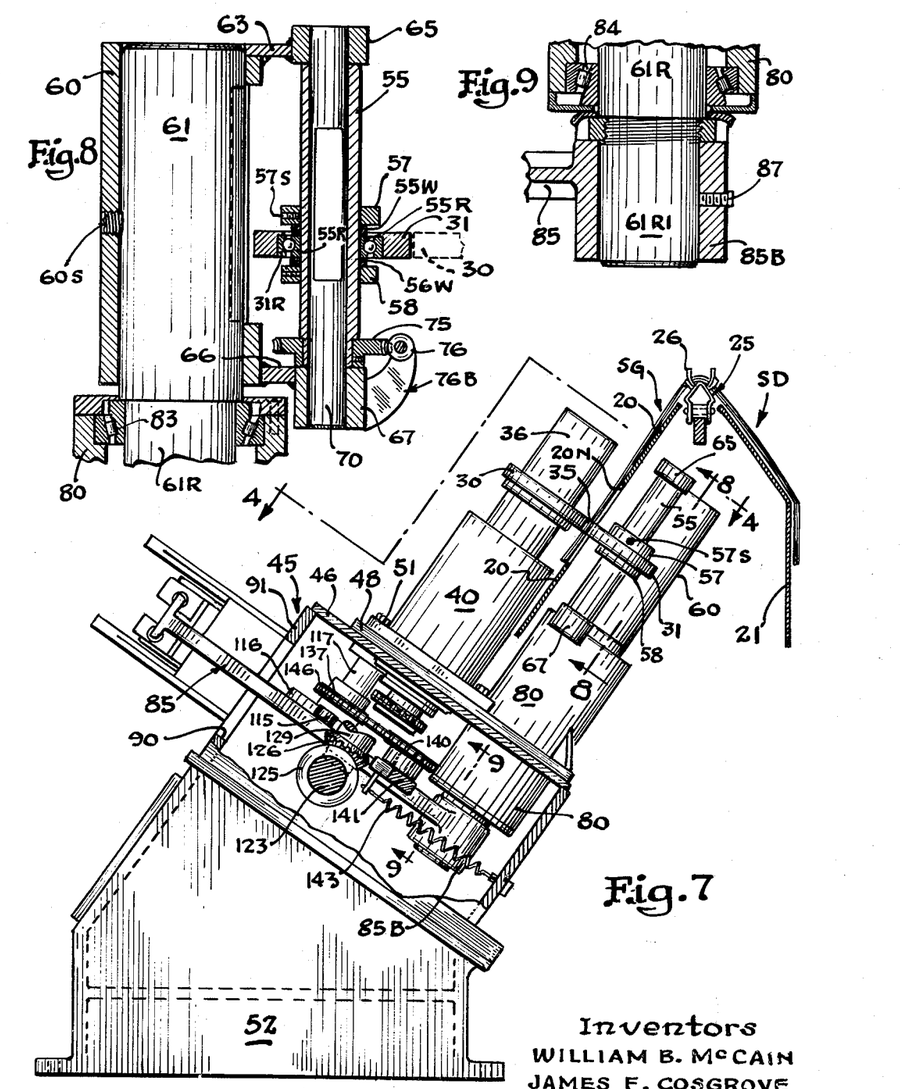
FIG. 7 is a sectional view taken substantially on the line 7—7 of FIG. 1.
FIG. 8 is a sectional view taken substantially on the line 8—8 of FIG. 7.
FIG. 9 is a fragmentary sectional view taken substantially on the line 9—9 of FIG. 7.

The essential components of a signature machine 19 constructed under the present invention are illustrated in FIG. 1 as comprising an elongated saddle SD which afford a horizontal guide for the signature groups as will be explained. The saddle SD, as shown in FIG. 7, includes a pair of support plates 20 and 21 oriented in a generally inverted V-shaped disposition, which is to say that the plates 20 and 21 affording the saddle SD are sloped downwardly and outwardly as will be apparent in FIG. 7. These plates are separated at the upper edges thereof to afford a channel in which a conveyor belt 25 is disposed for movement along a horizontal conveyor path.

Upright feeder elements 26, FIG. 7, are secured to the conveyor belt in a spaced relationship, and the spacing will be such that these will be effective on the trailing edge of a signature group SG so as to advance the individual signature groups SG, along the conveyor path in the direction of a stitching mechanism SM, FIG. 1.

Figure 3:
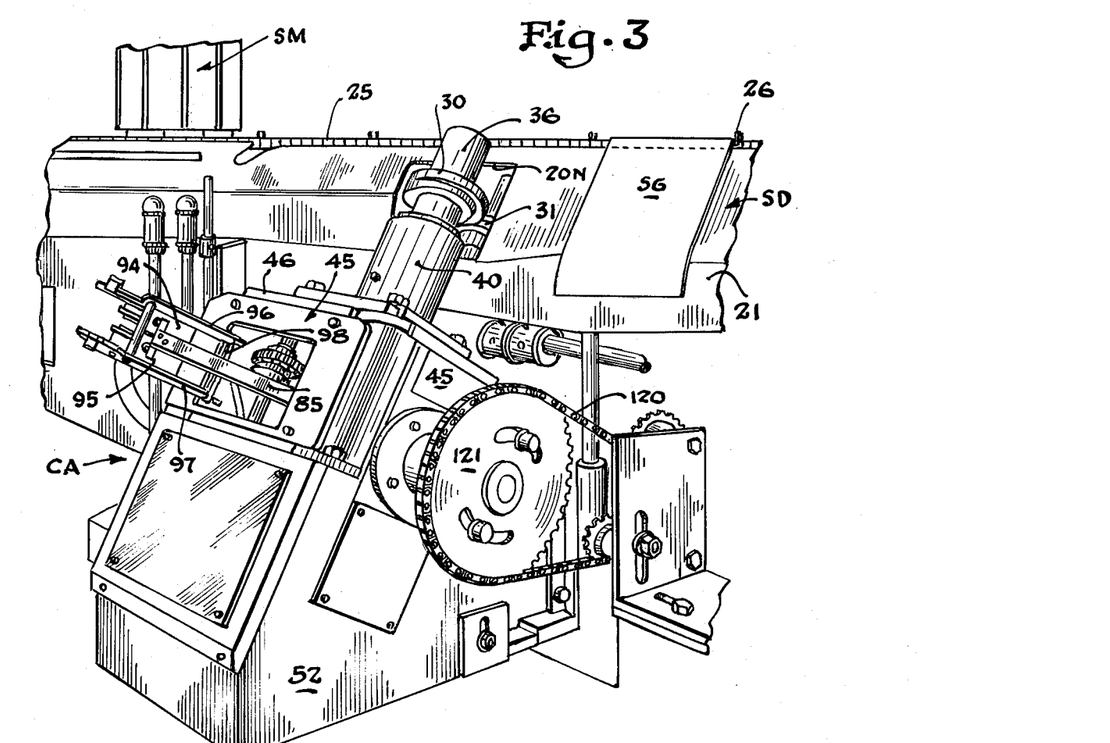
FIG. 3 is a perspective view of parts at the calipering station in the machine.

Thus, signature gathering mechanism, not shown, will be afforded at a right-hand end of the machine not visible in FIG. 1, and such gathering mechanism, as is well known in the art, is effective to feed individual signatures in folded form so that these are dropped on to the saddle SD to be picked up by the conveyor elements 26. The signature groups, as will be apparent from FIGS. 3 and 7, are draped on the saddle SD with the backbone or fold of each at the apex of the saddle in position to be pushed by the conveyor elements 26. Thus, half the sheets of the signature group at one side of the fold move along the front or left-hand saddle plate 20, FIG. 7, and the other half move along the rear or right-hand saddle plate 21.

The individual signatures in a folded state are initially stacked in individual hoppers of the signature gathering mechanism, these hoppers being spaced above the saddle SD, and the feeding of the signatures from the hoppers is such that one signature will be dropped atop another on the saddle to afford a signature group SG, FIG. 7, which is inclusive of a predetermined number of individual folded signatures. Gathering mechanism of the aforesaid kind is typified by the structure disclosed in my co-pending application Serial No. 8,629, filed February 15, 1960, now U.S. Patent No. 3,087,721.

The stitching mechanism SM, FIG. 1, is inclusive of a plurality of spaced, vertically disposed stitching heads SH of identical construction, and these stitching heads are effective in normal operation to join the signatures in a group SG to complete a book. The stitching heads SH are in reality staplers, and wire for the staples is supplied from individual spools SP, FIG. 1, in a manner to be described in detail hereinafter.

It is important of course to assure that a completed book will contain the correct number of individual signatures. Under the present invention this is determined, prior to joining the signatures into books, by calipering apparatus CA, FIG. 1, of novel construction including a pair of calipering rollers between which a signature group to be calipered moves. It will be observed in FIG. 1 that the calipering apparatus is located at a calipering station well to the right of the stitching means, and as will be described in detail hereinafter the calipering apparatus is effective to measure the thickness of a signature group, to determine if the measured thickness represents a complete book, prior to this group reaching the stitching mechanism.

It may here be explained that the calipering apparatus is effective to measure what amounts to the thickness of the signature group along one side of the fold on the saddle SD. Since the correct number of pages and thickness thereof in a correct signature group will be predetermined, the calipering apparatus will be adjusted to caliper this thickness prior to each run of the machine. If there is a departure from this standard or datum thickness either in a too thick or too thin sense, this condition is indicated by movement of a roller in the caliper apparatus out of datum position, whereupon the stitching heads are to be rendered ineffective to staple the incomplete or bad book in a manner to be explained.

Other relationships may be established as a consequence of detection of a book of improper thickness by the calipering apparatus. Thus, it may be mentioned that in a machine of the kind under consideration it is common practice to separate the good books from the bad books at the delivery end of the machine by having resort to so-called switch fingers. These switch fingers are usually solenoid-controlled so as to be effective to guide the unstapled signatures in a defective or incomplete signature group to a collecting station. The signatures thus separated, not having been stapled or stitched, can then be re-allocated to the supply hoppers.

The feeder elements 26, as noted, are secured to the conveyor belt 25 in spaced relationship. Thus, the elements 26 are in the form of U-shaped pins having the legs thereof projecting upward and the bight or bend thereof removably pressed through openings in the individual inverted V-shaped plate elements 25A that afford the conveyor belt. Thus, the feeder elements or pins 26 can be varied in spacing to establish particular feed rates for the signature groups. Concurrently, the speed of the conveyor will be changed. This in essence is a timing proposition, and an essential feature of the present invention is that the caliper apparatus can be easily adjusted to be synchronized as a necessary concomitant to the rate and speed of movement of the feed pins 26, and therefore the signatures groups, past the caliper apparatus.

*The calipering apparatus*

Figures 4, 5:
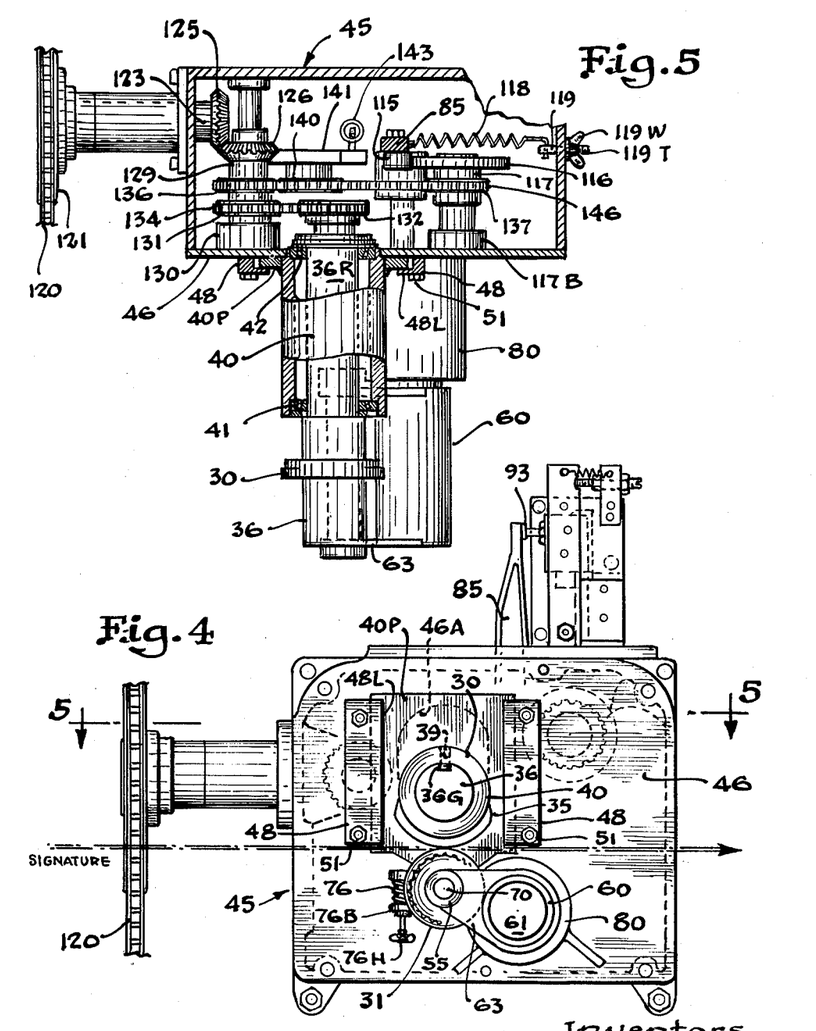
FIG. 4 is an elevational view taken substantially on the line 4—4 of FIG. 7.
FIG. 5 is a sectional view taken substantially on the line 5—5 of FIG. 4.

The calipering apparatus in the present instance is inclusive of a roller in the form of a calipering cam 30, FIGS. 4, 5 and 7, and an opposed member in the form of an idler disc or roller 31. The cam 30 and the roller 31 are on parallel axes which in turn are parallel to the slope of the front saddle plate 21. The cam 30 is on one side of the saddle plate, and the roller 31 is on the other side. The plate 20 is notched at 20N in a wide area within the path of movement of the signature groups on the saddle.

The cam 30 and the roller 31 are located within the area of the notch 20N which defines the calipering station, and these elements are aligned in a plane normal to the aforesaid axes as will be apparent in FIG. 7 so as to afford a calipering roller couple between which a signature group advanced along the saddle SD is to move, which is to say that the pages of the signature group at one side of the fold thereof on the saddle are to move over the notch 20N and between the cam 30 and the opposed roller 31. Referring to FIG. 4, the calipering cam is provided with a calipering segment 35 which will rotate past the opposed member 31 during an interval of rotation of the cam 30, to be effective to squeeze the signature group moving therebetween.

The cam 30 is secured to a sturdy shaft 36 of large diameter which is rotated in a manner to be described hereinafter. Thus, shaft 36 represents the rotative axis of the cam 30. The shaft 36 is formed with a groove 36G, FIG. 4, and a set screw 39 is carried by the cam 30 and is adapted to seat in the groove 36G so as to secure the cam 30 to the shaft 36 for rotation therewith. This arrangement enables the cam 30 to be adjusted longitudinally of the shaft 36 for a purpose to be explained hereinafter.

As will be noted in FIG. 7, the axis of the cam 30 afforded by the shaft 36 is disposed parallel to the incline or slope of the plate 20 of the saddle SD. The axis of the opposed member 31 is also related to the saddle SD in this manner. The axis of the cam 30 is fixed, which is to say that the cam axis is rigid and unyielding throughout a run of the machine, although this axis can be changed as will be explained for another run. On the other hand, the axis for the opposed roller 31 is arranged to float or oscillate depending upon signature group thickness as will be described hereinafter.

Referring now to FIGS. 5 and 7, the shaft 36 which carries the cam 30 is supported for rotation in a mounting sleeve 40. Thus, the shaft 36 includes a portion 36R of reduced diameter that is disposed within the sleeve 40. Ball bearing races 41 and 42 are arranged at the opposite ends of the sleeve 40 to support the shaft 36 for free rotation therein. The sleeve 40 projects outward of and is adjustably clamped to a housing 45 which includes a mounting plate 46 rigidly associated therewith and in a plane facing the saddle, normal to the axis of the shaft 36. To this end, the sleeve 40 is secured at the end adjacent the housing 45 to a relatively large base plate 40P, FIGS. 4 and 5. The mounting plate 46 of the housing 45 is provided on the outer face thereof with a pair of spaced elongated clamps 48 secured in place on the housing plate 46 by bolts 51. The clamps have lugs as 48L which engage the outer margins of the base plate 40P at the opposite sides of the sleeve 40, and when the bolts 51 are tightened the lugs 48L clamp the base plate 40P of the sleeve 40. In this manner, the mounting sleeve 40 for shaft 36 is rigidly secured to the housing 45, and in this connection it will be noted, FIG. 7, that the housing 45 is secured to a floor mounted base 52.

Referring to FIG. 4, the plate 46 is slotted at 46A to enable shaft 40 to be moved therein. The clamps 48 are relatively long and in effect afford a guide track for the base plate 40P associated with the sleeve 40. Thus, by loosening the bolts 51, the lugs 48L are released sufficiently to enable the sleeve 40 to be shifted in a direction normal to the plane of the saddle plate 20 as will be apparent in FIG. 7, and this enables the axis of the cam 30 to be shifted toward or away from the opposed roller 31 for reasons to be explained hereinafter.

The roller 31 which is aligned with the cam 30 so as to be opposed thereto is carried by a support shaft 55 having the axis thereof parallel to the axis of the shaft 36 which carries the cam 30. The roller 31 is freely rotatable relative to its supporting shaft 55 in order that the signature group, when squeezed by the rollers 31 and the calipering segment, will glide through the calipering couple. To this end, the roller 31 on its inner periphery is provided with a ball bearing race 31R, FIG. 8, related to an opposed race 55R on the shaft 55.

The race 55R is held against rotation on shaft 55 by rubber washers 55W and 56W which clamp opposite sides of the race 55R. Thus, the roller 31 is maintained in a position accurately aligned immediately opposite the cam 30 by a pair of collars 57 and 58, FIG. 7, which in turn are secured to the shaft 55 by set screws as 57S, and these collars also press the washers 55W and 56W to hold the race 55R against rotation. It will be realized that by loosening the set screws as 57S, the roller 31 and collars 57 and 58 can be shifted bodily on the shaft 55 to a selected position where the roller 31 will be immediately opposite the rotative path of the cam 30.

This shifting of the roller 31 will of course be concurrent with a like adjustment of the cam 30 along the axis of the shaft 36. This is so in order that the calipering couple 30 and 31 can be adjusted to caliper a selected portion of the signature group. Thus, there are many instances where inserts such as return mailing cards and the like are to be part of the completed book. Such inserts may be located at various positions within the signature group, and it is therefore important that the insert be calipered to assure that it is present. It will therefore be recognized that an important feature of the present invention is the ability to shift the calipering couple 30 and 31 along their axes 36A and 55A, FIG. 6A, to caliper at a selected common area of the signature groups moving through the machine during a particular run of the machine It was mentioned that the roller 31 is arranged to float or oscillate depending upon signature thickness. This is accomplished by in effect cantilevering the roller 31 on a sleeve 60, FIGS. 4, 5, 7 and 8, which is secured by a set screw 60S, FIG. 8, to an oscillatable shaft 61. In cantilevering the roller 31 as aforesaid, one end of an arm 63, FIG. 8, is rigidly joined to the outer end of the sleeve 60 to project at right angles thereto, and a mounting boss 65 is secured to the other end of arm 63. One end of an arm 66 is secured to the sleeve 60 at the end opposite the arm 63 to project at right angles thereto, and a mounting boss 67 is secured to the arm 66. The two bosses 65 and 67 that are thus spaced outboard of and along one side of the sleeve 60 are formed with apertures representing a cradle for a support 70 as shown in FIG. 8. Thus, the opposite ends of the support 70 are carried by the mounting bosses 65 and 67, and it will be noted that the support 70 is disposed within the sleeve or shaft 55 which carries the roller 31.

Sleeve 55 is an eccentric sleeve and is to be turned on the support 70 as a center in order to permit the roller 31 to be adjusted accurately toward or away from the cam 30 incidental to adjusting the calipering couple accurately to the correct signature thickness. Thus, a worm wheel 75 is secured to shaft 55 at the end thereof adjacent the mounting boss 67 as shown in FIG. 8. A worm 76 is meshed with the worm wheel 75, and as shown in FIG. 4, the worm 76 is carried by bracket structure 76B that is secured to the mounting boss 67 as a fixed support therefor. The worm 76 includes a knob 76H, FIG. 4, to enable the worm to be manually turned to rotate the worm wheel and impart fine circumferential adjustments to the shaft 55 which carries the opposed member 31. Thus, when the worm wheel 75 is turned, the eccentric shaft 55 is turned on the support 70 as a center.

The oscillatable shaft 61 includes a reduced portion 61R, FIG. 8, which is disposed within a cylindrical mounting sleeve 80 which is secured to the mounting plate 46 of the housing 45, and the reduced portion 61R of the shaft 61 is supported by ball bearing races 83 and 84, FIGS. 8 and 9, that are located within the cylindrical sleeve 80. In this connection it is to be noted that the sleeve 80 is partly disposed within the interior of the housing 45 as shown in FIG. 7. The shaft 61 includes an additional reduced portion 61R1, FIG. 9, that is disposed within the housing 45. An indicator or control lever 85, FIG. 7, is disposed within the housing 45, and this lever is provided at the lower end thereof, as viewed in FIG. 7, with a mounting boss 85B, FIG. 9, which is mounted on the reduced portion 61R1 of shaft 61 and is secured thereto by a set screw 87. Thus, the arm 85 is secured to the shaft 61 for oscillation therewith.

As shown in FIG. 7, the arm 85 is in the form of a relatively long lever having the upper portion thereof disposed outward of an opening 90 in the top plate 91 included as a part of the housing 45. The end of the lever arm 85 that is outward of the housing 45 is provided with a switch wiper element 93, FIGS. 10 and 11, and this wiper is of such length as to span the contact plungers 94P and 95P of related microswitches 94 and 95.

Figure 10:
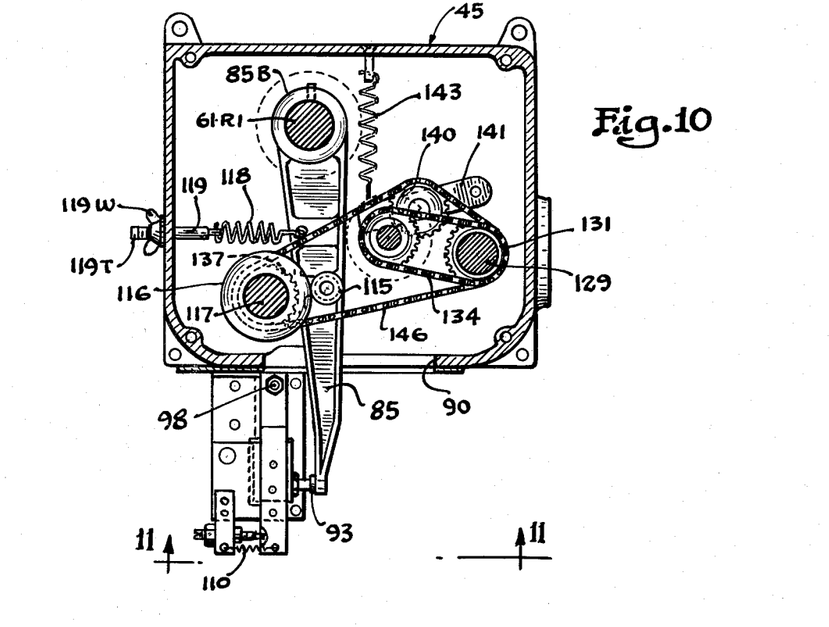
FIG. 10 is a sectional view taken substantially on the line 10—10 of FIG. 11.
Figure 11:
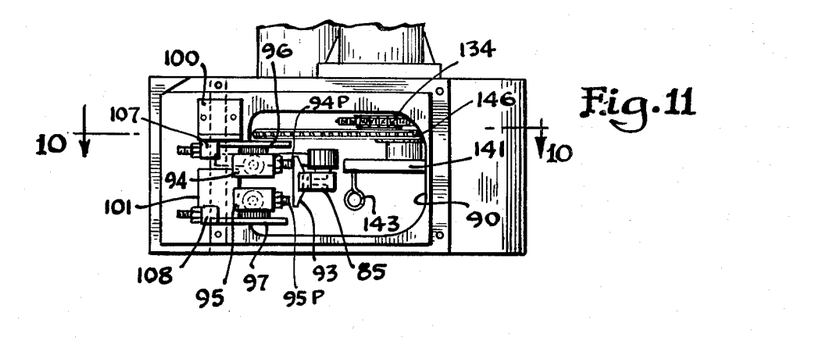
FIG. 11 is a plan view taken substantially on the line 11—11 of FIG. 10.

As shown particularly in FIG. 3, the microswitches 94 and 95 are supported by respective arms 96 and 97 which extend vertically outward of the housing 45 generally parallel to the disposition of the arm 85. The switch mounting arms 96 and 97 are pivotally supported on a pin 98, FIG. 10, at one side of the opening 90 in the top plate 91 of the housing 45. A pair of brackets 100 and 101 also extend upwardly from the top plate 91 of the housing 45, and these brackets are rigidly secured in place and serve as supports for respective differential screw elements 107 and 108 for accurately positioning the arms 96 and 97 which carry the microswitches 94 and 95. In this connection, it will be noted that return springs as 110, FIG. 10, are effective to urge each microswitch supporting arm as 96 against the related differential screw. Thus, by turning a differential screw 107 or 108 in or out as the case may be, the related microswitch can be moved closer to or farther away from the wiper 93 of the switch control arm 85.

As will be explained in detail below, the control lever 85 will oscillate to different positions corresponding to the different positions in which the idler roller 31 may be disposed during calipering of a signature group. Thus, the arm 85 may be disposed in a position corresponding to a signature group that is measured as being too thick, or arm 85 may be disposed in a position corresponding to a signature group calipered as being too thin. The microswitches 94 and 95 are assigned to these respective thick and thin departures from proper thickness of the signature groups being calipered in a particular run of the machine, and in the form of the invention herein disclosed, the microswitch 94 will sense a too thick condition and the microswitch 95 will sense a too thin conditiion.

Referring again to FIG. 11, this can be further explained with reference to right or left hand movement of the lever 85. Lever 85 in its normal or datum position disposes the wiper 93 to bear on plunger 94P to hold the related switch 94 in an open position. At the same time, plunger 95P is free of the wiper 93, and switch 95 remains in its normally open position. Now, if a signature group is calipered as being on the too thick side of the predetermined proper thickness, the lever 85 will move to the right as viewed in FIG. 11, allowing switch 94 to close. Switch 95 remains open. Conversely, if the signature group being calipered is measured as being on the thin side of the predetermined proper thickness, the lever arm 85 shifts to the left as viewed in FIG. 11, closing switch 95. Switch 94 remains open.

For reasons to be explained hereinafter, particularly in connection with FIG. 6, the idler roller 31 and the switch control arm 85 are normally maintained in what can be referred to as respective datum positions, representative of a signature group of proper thickness. The datum position is to be maintained during rotation of the cam 30 except during the interval thereof when the calipering segment 35 is rotating past the opposed member. The calipering segment 35 is intended to caliper for about two inches of signature movement, and extends for about 90° of arc on the cam 30. In establishing the datum positions, the lever 85 is provided with a cam follower in the form of a roller 115, FIG. 10, that is journalled on a pin supported by the arm 85 substantially midway of the length thereof. A timing cam 116 is disposed opposite the roller 115 within housing 45. Thus, cam 116 is carried on a stub shaft 117 supported for rotation, FIG. 5, in a bearing 117B secured in the housing 45. A spring 118, FIG. 10, is anchored at one end on the lever 85, and this spring at the opposite end is secured to a stud 119 that is adjustably anchored on a side plate of the housing 45 by a wing nut 119W threadedly mounted on a threaded portion 119T of the stud 119 which is outward of one side of the housing 45.

It will be recognized that the wing nut 119W can be so adjusted on the threaded portion 119T of the stud 110 as to establish predetermined tension in the spring 118 effective to urge the arm 85 with the roller 115 thereon bearing against the cam 116. The spring 118, it will be realized, is also effective through the tension exerted on arm 85, to exert a rotative basis on the oscillating shaft 61. In this manner, the roller 31 is yieldably urged toward the opposed cam 30, but this yielding action and the extent of spacing between the rollers 30 and 31 is under control of the cam 116.

Figure 6:
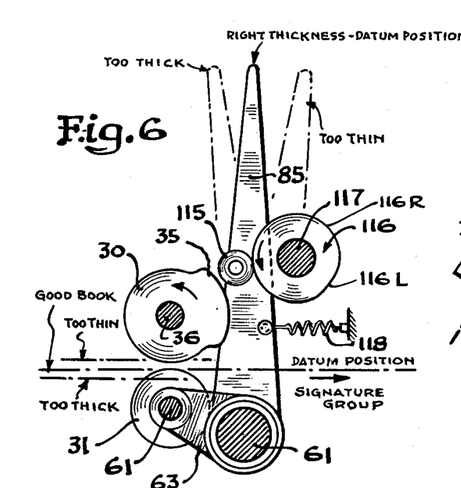
FIG. 6 is a schematic view of the calipering components under the present invention.

Thus, the cam 116 is formed with a low spot 116L, FIG. 6 (about 0.010″), of about 65° arc, such that when the low surface or dwell on the cam 116 is presented to the follower 115 on arm 85, the spring 118 is then effective to induce oscillation of the shaft 61 manifest in a free floating condition of the shaft 61 within limits at this time.

The cams 30 and 116 are synchronized in that the low part or dwell of cam 116 is gauged to be in time with the high part or lobe segment 35 of cam 30. Due to the differences in arc (65° vs. 90°) the calipering segment will be presented to a signature group slightly ahead of the dwell on cam 116 being presented to the follower 115. Conversely, the dwell of cam 116 will leave the follower 115 before the end of calipering. The major extent 116R of the cam 116 is of a radius that disposes the idler roller 31 spaced from the calipering segment 35 by a distance corresponding to correct book thickness. Whether the shaft 61 oscillates during calipering in fact depends upon the dimension of the signature group being calipered as will be explained.

The calipering cam 30 and the control cam 116 which controls oscillation of shaft 61 are to be cyclically operated continuously during operation of the machine. To this end, the machine includes a main drive unit from which all drives emanate. The drive to the calipering unit includes a chain 120, FIGS. 3–5, which is trained around a large sprocket 121 so as to impart continuous rotation to a driven shaft 123, FIG. 5, supported for rotation in one of the side plates of the housing 45.

The end of the shaft 123 opposite the sprocket 121 is provided with a bevel gear 125 that is disposed within the housing 45 and is there meshed with a bevel gear 126 fixed on a rotatable stub shaft 129. The stub shaft 129 is rigidly supported in a bearing 130, FIG. 5, within the housing 45, substantially in a right-angular disposition with respect to the shaft 123. Shaft 129 inward of the bevel gear 126 is provided with a sprocket 131. This sprocket is opposite a sprocket 132 that is secured to a reduced end of shaft 36 that is disposed within the housing 45 as shown in FIG. 5. A drive chain 134 is trained around the sprockets 131 and 132, and it will therefore be seen that the chain 134 is effective to impart continuous rotation to shaft 36 which carries the calipering cam 30.

Another sprocket 136 is secured to the shaft 129 for rotation therewith, and this sprocket, as shown in FIG. 5, is disposed between the bevel gear 126 and sprocket 131. A sprocket 137, FIGS. 5 and 10, is secured to the shaft 117 which carries the cam 116. An idler or take-up sprocket 140, FIGS. 5 and 10, is interposed between the sprockets 136 and 137, and the idler sprocket 140 is carried on an arm 141 which is pivotally related to the housing 45. The arm 141 is tensioned by a spring 143 anchored at one end to the arm 141 and anchored at the other end to one of the bottom plates of the housing 45 as will be apparent in FIG. 11. The spring 143 is, therefore, effective to take up slack in a chain 146 which is trained around the sprockets 136, 137 and 140. In this manner, continuous rotation is imparted to the cam 116, and the parts are so dimensioned as to assure that the low part on the timing cam 116 will be presented to the follower 115, FIG. 10, when the calipering segment 35, FIG. 4, is moving past the opposed roller 31 as explained above.

In those instances where large movements of the sleeve 40, FIG. 4, away from the axis of the roller 31 are to be made, it may be advantageous to associate a take-up sprocket as 140 with the chain 134 that drives the cam shaft 36.

Operation of the caliper

Advantageously, and in accordance with the present invention, the calipering rollers 30 and 31 are normally spaced by a distance corresponding to the thickness of a signature group that characterizes a book that will contain the correct number of pages. As noted above, only the pages of one side of the folded signature group are calipered. At the beginning of a particular run of the machine, the caliper cam 30 will be turned to present the rise or calipering segment 35 thereon to the opposed member 31. At the same time, cam 116 will present its dwell to follower 115. The worm 76 will then be turned so as to exert a caliper squeeze action on a signature group of proper thickness disposed between the caliper members 30 and 31.

The signature group to be calipered will enter the calipering couple 30–31 when the low part of cam 30 is opposed to roller 31. Consequently, even though an excessively over-thick signature group should arrive at the calipering station, there is ample space therefor until the calipering segment is presented to the roller 31. Referring now to FIG. 6, the calipering segment 35 on the cam 30 during the calipering interval will sweep past the opposed roller 31, and the distance separating these two rollers at this time will correspond to a signature group of correct thickness. Simultaneously with this sweeping action the low part of the cam 116 will be presented to the follower 115. As a consequence of this, the spring 118 is free to exert a rotative bias on the oscillating shaft 61, tending to urge the opposed member 31 toward the cam segment 35. Thus, during the calipering interval, conditions are established enabling the opposed member 31 to float on either side of the datum position shown in FIG. 6. If the signature group being calipered is on the thin side (too few pages) roller 31 will move upward out of datum position in FIG. 6, since the dwell on cam 116 permits spring 118 to be effective to induce clockwise rotation of shaft 61 as viewed in FIG. 6. This will correspond to a right-hand movement of the switch control arm 85 out of its datum position, FIG. 6, effecting closure of microswitch 95 to establish a control as will hereinafter be described.

On the other hand, if the signature group is on the too thick side of correct book thickness (too many pages) when cam 116 presents its dwell to follower 115, then the calipering segment 35 will be effective to press the opposed roller 31 downward out of datum position as viewed in FIG. 6. This will occur against the resistance of spring 118 and will be manifest in counterclockwise movement of shaft 61 and arm 85, FIG. 6, permitting microswitch 94 to close.

Still further, if the signature group being calipered corresponds to correct book thickness, then both the roller 31 and the associated control switch arm 85 will remain in their medial or datum positions illustrated in FIG. 6. Under this condition, both microswitches 94 and 95 are maintained in an open position. At this point it may be mentioned that cam 116, except for the low part or dwell mentioned, has a uniform radius that is effective on the follower 115 to hold the arm 85 and roller 31 in their datum positions.

An important feature of the present invention is that there is a substantial multiplying effect between movement of the roller 31 out of datum position and the movement of the control switch arm 85 out of datum position. Thus, the arm which cantilevers the roller 31 on the oscillating shaft 61 is quite short, and the switch arm 85 is a multiple of the length thereof. In actual practice, the ratio is about 5:1 such that for each increment of movement of the roller 31 out of datum position, the switch wiper 86 on the control arm 85 shifts through five increments. An average page thickness is about 0.001″. As a consequence, a single page departure, one way or the other, from correct signature group thickness in a signature group will be manifest in a movement of at least about .005″ of the switch wiper 86 which is enough to control accurately operation of the microswitches 94 and 95 which, it will be recalled, can themselves be adjusted through the differential screw elements described above. Additionally, the worm 76 enables fine adjustments to be made in the calipering couple.

Thus it will be seen that movement of the roller 31 toward or away from the cam segment 35 is multiplied in the arm 85 and as a consequence single page variations can be accurately registered by the switches 94 and 95. Ultimate control of the switches 94 and 95 is, therefore, effected by but few parts, and these are so mounted and arranged as to minimize distorting effects. Thus, the shafts 36 and 61 are rigidly mounted to eliminate play or backlash therein and this assures that page variations only in the signature group being calipered will have any substantial or significant effect on the position of arm 85 during a calipering interval. A further important feature of the present invention is that the component parts of the caliper apparatus are ruggedly constructed to minimize distortions. In other words, backlash is virtually eliminated, and this is made possible by arranging the calipering cam 30 on a fixed or rigid axis in the first instance represented by the shaft 36 on which the cam 30 is mounted, noting that this shaft is supported by two bearings 41 and 42, FIG. 5, in the sleeve 40. Shaft 36 itself is quite large in diameter as will be evident in FIG. 5, and this also applies to the oscillating shaft 61 that is disposed in the sleeve 60. Again, shaft 61, FIGS. 8 and 9, is supported by two bearings 83 and 84.

As noted above, the calipering rollers 30 and 31 are shiftable axially on their respective shafts 36 and 55 so as to be capable of being moved to variant aligned positions within the notch 20N of the forward saddle. Thus, referring to FIG. 6A, the full line positions for the rollers 30 and 31 on their axes 36A and 55A (center lines in FIG. 6A) are indicative of a condition where the calipering couple has been moved quite near the lower edge of the notch 20N in the saddle plate 20 so as to caliper quite near the lower edge of the signature group at one side of the fold thereof. On the other hand, as shown by dotted lines in FIG. 6A, the rollers 30 and 31 can be moved upward in the notch in the saddle plate 20 to caliper higher on a signature group, and such selected positions may be necessary in order to caliper the part of a signature group where an insert such as a return mailing card or the like is present.

Figure 6A:
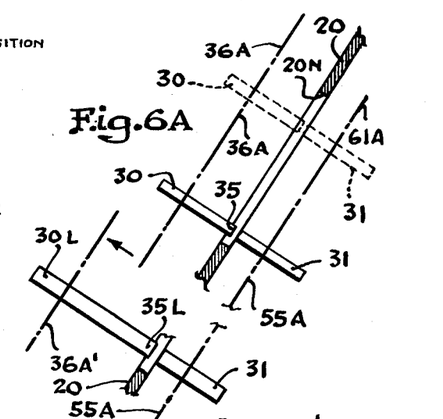
FIG. 6A is a diagrammatic view illustrating adjustment aspects of the calipering apparatus.

It will be appreciated that the conveyor 26 in a machine of the kind under consideration may be driven at variant speeds. Under the present invention, the calipering apparatus is arranged to comply with the speed of the conveyor. Thus, it is advantageous to have the calipering segment 35 move past the opposed member 31 at a peripheral speed corresponding to the signature groups through the machine. Under the present invention, this advantageous relationship can be achieved merely by providing a cam as 30 that will have a segment 35 on a radius that will result in a circumferential speed of the calipering segment corresponding to the lineal rate of travel of the signature groups along the saddle. This is achieved, without the necessity of changing the gear ratios, merely by shifting the axis for the cam as 30 and substituting a larger or smaller cam as the case may be. Thus, if a larger cam 30L, FIG. 6A, is required having a calipering segment 35L on a greater radius in comparison to the calipering segment 35, it is merely necessary to shift the axis of the calipering cam to a new fixed position 36A′, FIG. 6A, spaced farther from the axis 55A of the opposed member 31, which remains unchanged. In other words, the smaller cam 30, FIG. 6A, will be removed, shaft 36 will be shifted by opening the clamps 48, whereafter the larger cam 30L, FIG. 6A, is substituted that has a calipering segment on a radius that will have a peripheral speed corresponding to a greater speed of signature groups than is possible with the cam 30.

*Wire feed control*

In the event that a signature group of improper thickness is detected by the calipering mechanism, there is to be an effect on subsequent operations performed on this signature group in the machine. Thus, for example, the improper signature group is not to be stitched, and the attendant control emanates from closure of a microswitch 94 or 95. Such operation of a microswitch of course occurs in the calipering cycle of the machine, which is a cycle that occurs before the stitching cycle, or the sorting cycle at the delivery end of the machine. In view of this, information that a bad book has been detected is to be stored as will hereinafter be described, and the timing is such that when the improper signature group reaches the stitching heads SH, a solenoid 155, FIG. 1, is to be energized to prevent the stitching heads from being effective on the improper signature group. This is accomplished by a stitching head constructed in the manner disclosed in FIG. 12, or in the manner disclosed in FIG. 19, as explained in more detail hereinafter.

Figure 12:
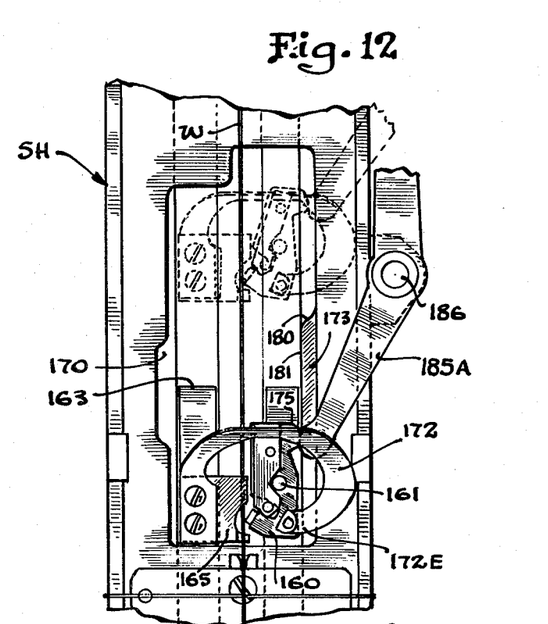
FIG. 12 is a fragmentary front elevation of a stapling head used in the present machine.

Referring now to FIG. 12, the stitching heads SH are of a known construction except for the modification under and in accordance with the present invention. Thus, the stitching heads SH are in the form of Bostitch staplers of the "18D" type each equipped with a wire feed dog or so-called grip holder 160, FIGS. 12 and 13, that is pivotally supported on a pin 161 carried by a vertically movable bender bar 163.

The dog 160 includes a hardened steel toe 164 that is disposed opposite a lug or anvil 165 that is carried by the bender bar 163 on which the dog 160 is pivotally mounted. The anvil 165 is formed with a guide groove 165G in which the wire W is disposed to feed, and during a feed action performed thereon, the hardened steel toe 164 of the dog 160 is effective to clamp the wire W in the guide groove 165G when undergoing downward movement in the stapling head.

Thus, the bender bar 163 is disposed in a vertically oriented recess 170, FIG. 12, for vertical movement therein. The manner in which the bar 163 is raised and lowered constitutes no part of the present invention, and it suffices to explain that pivotal movement of the dog 160 is partly under control of a leaf spring 172 and a fixed cam surface 173. The leaf spring 172 is carried by the bender bar 163, and one end 172E thereof bears against the dog 160 to urge the same in a clockwise direction as viewed in FIGS. 12 and 13 so as to bring the hardened toe 164 against the wire W that is guided in the lug or anvil 165. This is the condition that prevails when the bender bar 163 is in the dotted line position illustrated in FIG. 12 at a time when the bender bar 163 is in its uppermost position just ready to advance downward the next length of wire needed for the staple to be formed, or in other words at a time when a signature group to be joined into a book is nearing the stitching station.

As the dog or gripper 160 is forced downward from the dotted line position in FIG. 12, the wire is fed thereby and continues to be fed until a toe 175 at the right hand side of the gripper 160 as viewed in FIG. 12 strikes the inclined upper end 180 of the cam 173. This engagement of the gripper 160 with the cam surface 180 pivots the gripper counterclockwise as viewed in FIG. 12. Resultantly, the gripper is released and is held released as the toe 175 thereon moves downward along the flat surface 181 of the cam 173 to the full line position of the gripper 160 shown in FIG. 12.

In other words, there is no wire feed during the interval that the toe 175 on the feed dog 160 is travelling on the flat face 181 of the cam 173. Therefore, at the bottom of the full downward stroke of the bender bar, the gripper 160 does not grip the wire. At this point it should be mentioned that a driver (not shown) is effective on the upstroke of the bender bar to hold the gripper 160 in its released position so that it merely glides past the wire W. This condition prevails until the bender bar is arrested at the top of its stroke when the feed dog reaches its dotted line position in FIG. 12, and thereafter over-travel of the driver (not shown) with respect to the arrested bender bar permits spring 172 to take over and urge the gripper 160 to its wire gripping position shown by dotted lines in FIG. 12. These movements are described in detail in U.S. Patent No. 1,252,011.

Figure 14:
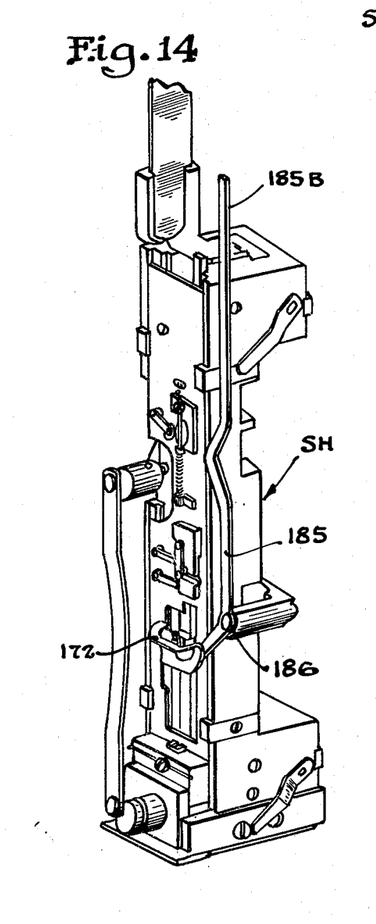
FIG. 14 is a perspective view of a stapling head aforesaid.

Under the present invention, a lever 185, FIG. 14, is associated with each stitching head at the stitching station and as will be noted in FIG. 1. Each lever 185 is relatively long in nature and is pivoted on a pin 186 that is secured to the bender bar of the stitching head for up and down movement with the bender bar. The lower portion of each lever 185 includes an inwardly bent leg 185A, FIG. 12, having a projection 187 at the free end thereof adapted to travel with and opposite the toe 175 of the wire gripper 160.

Each wire feed control lever 185 includes a relatively long upward extension 185B, FIGS. 1 and 14, and the upper portions thereof are embraced by respective pairs of guide rollers 190, FIG. 1, that are carried by a horizontally reciprocal bar 191. The bar 191 is guided for accurate movement in a horizontal plane on the front face of the frame structure FS, FIG. 1, associated with the stapler heads, and such guiding relationship is established by guide pins as 193 and 194 that are secured to the frame structure FS and which are disposed in an elongated slot 196 in the control bar 191.

The right-hand end of the control bar 191 as viewed in

FIG. 1 is connected by a link 197 to the armature of the solenoid 155.

In the unenergized state of the solenoid 155, each lever 185 is disposed in the position illustrated in FIGS. 1 and 12, and in this position each lever 185 merely moves with the bender bar 163 in each stapling cycle without any effect on the associated wire gripper 160. However, when solenoid 155 is energized and held energized due to an imperfect book being calipered, its armature is effective to pull the control bar 191 to the right as viewed in FIG. 1. This operation is timed to occur simultaneously with the wire grippers reaching the dotted line position illustrated in FIG. 12, or the full line position illustrated in FIG. 13, just prior to the descent of the bender bars 163.

Figure 13:
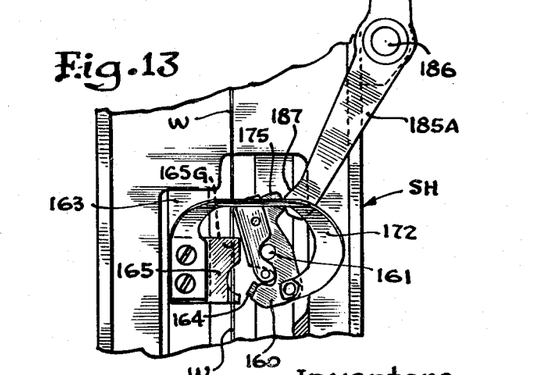
FIG. 13 is a fragmentary elevation similar to FIG. 12 but showing a different relationship of parts.

When the control bar 191 is pulled to the right, the levers 185 are pivoted clockwise as viewed in FIG. 12 so as to strike the gripper toes 175, thereby kicking the wire grippers counterclockwise to a wire releasing position illustrated in FIG. 13. Consequently, on the downstroke of the bender bar, when normally wire would be fed for staple formation, the wire feed dogs 160 are held in released position because, as noted above, the levers 185 move with the bender bar which carries the wire feed grippers 160.

Figure 15:
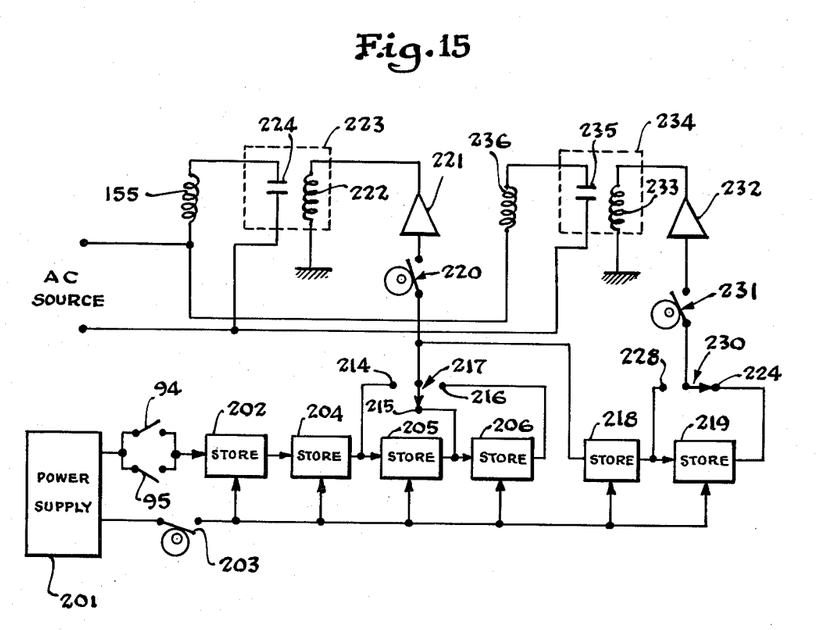
FIG. 15 is a simplified schematic diagram of the electrical operating circuit of the machine.

FIG. 15 illustrates, in simplified schematic form, the electrical operating circuit controlled by the "thick" and "thin" caliper switches 94 and 95. This circuit and associated parts to be described hereinafter can be conventionally contained within the base structure 52, FIG. 3.

As shown in FIG. 15, the switches 94 and 95 are connected in parallel with each other between a power supply circuit 201 and a first storage circuit 202. The storage circuit 202 may be of conventional construction and may, for example, comprise a bi-stable trigger circuit actuatable between a first storage or normal condition and a second storage condition in response to the application of an appropriate input signal. Magnetic core circuits and transistor circuits of this general kind are well known in the electronic arts.

In addition to the input circuit comprising the switches 94 and 95, the storage circuit 202 is provided with a reset circuit including a cam-actuated switch 203 that connects the storage circuit 202 to the power supply 201.

A second storage circuit 204 is connected to the output of the first storage circuit 202. The circuit 204 may be essentially similar to the circuit 202 and again comprises a bi-stable trigger circuit. The output of the circuit 204 is connected to a third storage circuit 205 which, in turn, is connected to an additional storage circuit 206. Each of the storage devices 204–206 is provided with a reset circuit connection through the cam-actuated switch 203. In addition, the output circuits of the storage devices 204, 205 and 206 are connected to the terminals 214, 215 and 216, respectively, of a selector switch 217. The selector switch 217, in turn, is connected to the input of an additional storage circuit 218 comprising a bi-stable storage device essentially similar to the devices 202, 204, 205 and 206. The output circuit of the device 218 is connected to a further storage device 219 of generally similar construction. Each of the storage units 218 and 219 is provided with a reset circuit connection through the cam-actuated switch 203.

The selector switch 217 is also connected, through a cam-actuated switch 220, to an amplifier-driver circuit 221 connected to the operating coil 222 of a stop-stitch solenoid control relay 223. The relay 223 includes a pair of normally open contacts 224 that are connected in series with the energizing circuit for the stop-stitch solenoid 155, FIG. 1.

The two storage devices 218 and 219, on the other hand, are individually connected to the input terminals 228 and 229, respectively, of a selector switch 230. The selector switch 230 is connected through a cam-actuated switch 231 to an amplifier-driver circuit 232 that is connected to the operating coil 233 of a control relay 234.

The control relay 234 includes a pair of normally open contacts 235 that are connected in series with the energizing circuit of a solenoid 236 which in turn is connected to the so-called "switch delivery" device (not shown) as it is styled in the art, which is the sorting or feed control device used to separate the imperfect from the perfect books at the delivery end of the machine. The switch delivery fingers "218" shown in FIG. 7 of Patent No. 1,644,192 are an early example of this in the art, as in FIG. 3 of Patent No. 1,831,497. Hence, further explanation or showing in this regard is not necessary except to note that the "switch delivery" fingers in the present instance are controlled by the solenoid 236, FIG. 15, rather than by a mechanical linkage as in the two above-noted patents.

In considering operation of the circuit shown in FIG. 15, it may first be assumed that, in a given sequence of operations, the sensing switches 94 and 95 are not closed. This would be the normal condition of operation, in which the signatures being processed by the machine fall within the limits established by the caliper switches. As long as this condition is maintained, the storage circuits 202, 204, 205, 206, 218 and 219 remain in a given operating condition in which they do not produce any actuating signals for either of the relays 223 and 224. Accordingly, operation of the machine continues uninterrupted.

In a given operating cycle, however, it may happen that one of the two switches 94 and 95 closes, indicating introduction into the machine of a signature that did not come within the established operating limits. When this happens, one of the switches 94 or 95 is closed in the manner described above, and a pulse or input signal is applied to the storage device 202, actuating it to its second storage condition. No further action takes place during this calipering cycle of the machine. In the next operating cycle of the machine, the switch 203 is closed momentarily, applying a reset signal to the storage circuit 202. This resets the device 202 to its original storage condition and produces an output signal that is applied to the storage device 204 to actuate it from its normal operating condition to its second or storage condition. In the next operating cycle of the machine the storage device 204 is restored to its original operating condition by the reset signal supplied through the switch 203 and an output signal is produced that is applied to the storage unit 205 to actuate it to its second storage condition.

In the next operating cycle of the machine, the storage unit 205 is reset and an output signal is supplied to the storage unit 206 to actuate the latter from its normal to its second storage condition. At the same time, with the selector switch 217 set in the position shown in FIG. 15, an output signal is applied to the driver circuit 221 from the storage device 205 through the circuit comprising the selector switch 217 and the cam-actuated switch 220, which closes at a point in the operating cycle determined by the cams and coinciding with a part of the time when an output signal is available from device 205. As a consequence, the relay operating coil 222 is energized, closing the contacts 224 and energizing the solenoid 155 to interrupt the stitching operation during this machine cycle. This is timed to prevent stitching of the signature that has been determined to be outside the defined limits established by the sensing switches 94, 95. It will be seen from this that the number of storage units 202–204–205 will depend upon the number of machine cycles between calipering and stitching.

In addition, the output signal from the storage device 205 is supplied to the storage device 218 and actuates the latter to its second or storage condition. In the next machine cycle, the reset pulse applied to the storage devices 206 and 218 through the switch 203 resets the storage circuits. When reset, the storage device 218 produces an output signal that actuates the storage unit 219 to its second operating condition. Thereafter, when the storage unit 219 is reset in the next operating cycle of the machine, an output signal is supplied to the driver circuit 232 through the selector switch 230 and the cam-actuated switch 231, which may be actuated simultaneously with the switch 220. In this cycle, therefore, the coil 233 is energized, closing the contacts 235 of the relay 234. This action is effective to energize the solenoid 236 which will set the "switch delivery" fingers (not shown) to cull the imperfect signature group.

The selector switch 217 makes it possible to actuate the stop-stitch solenoid 155 an integral number of machine cycles following the sensing of a deflective signature by the switches 94 and 95, and to adjust this number of cycles to the operating timing or sequence of the machine. Thus, by changing the switch 217 to engage its contact 214, the energization of the solenoid 155 may be advanced one cycle, effectively eliminating the storage devices 205 and 206 from the circuit insofar as the control of machine operations is concerned. By the same token, if the selector switch 217 is shifted to engage the contact 216, the storage device 206 is effectively incorporated in the control circuit, and the energization of the stop stitch solenoid 155 is retarded by one complete machine cycle.

The same effect is achieved by the selector switch 230, with respect to the operation of the relay 234 and control of the associated solenoid 236. Thus, with the selector switch 230 in its illustrated position, a two-cycle delay is introduced in operation of the solenoid 236, but this can be reduced to one cycle by moving the selector switch 230 to its alternate operating position. The cam-actuated switches 230 and 231 make it possible to use the output signals from the storage and delay devices at any given fractional portion of a machine cycle, depending on the settings of the cams.

Figure 16:
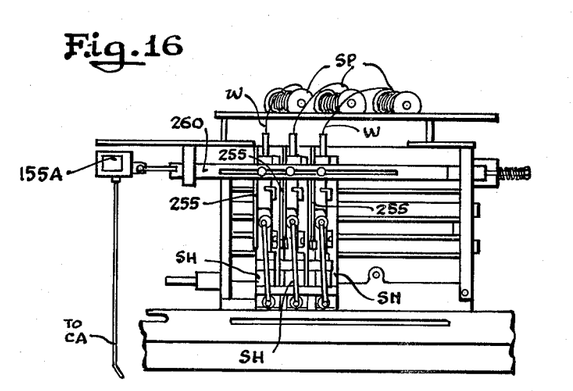
FIG. 16 is a schematic view of a portion of the stitching end of the machine as modified to include the wire feed control illustrated in FIG. 19.
Figure 17:
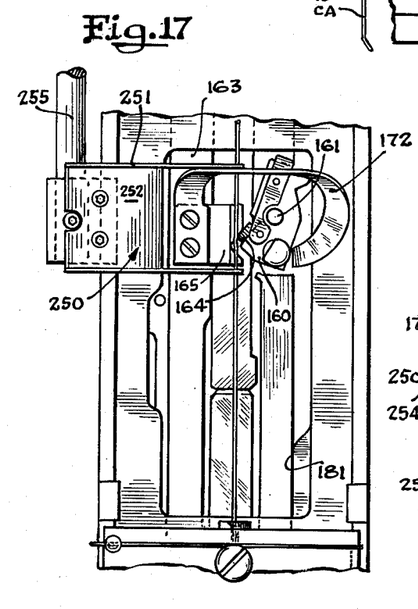
FIG. 17 is a fragmentary perspective view showing one position of the wire support yoke.
Figure 18:
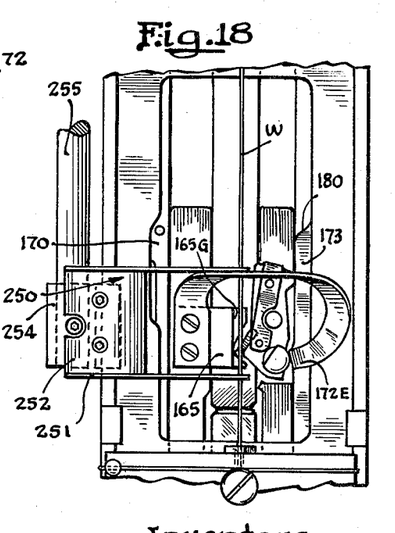
FIG. 18 is a perspective view similar to FIG. 17 but showing the wire support yoke in a different position.

Another and preferred method of preventing stitching of an improper signature group is illustrated in FIGS. 16 to 21. As in the foregoing embodiment, information that an improper signature group has been calipered is stored by means of the circuit described in connection with FIG. 15, and the timing is such that when the improper signature group reaches the stitching heads SH, a solenoid 155A, FIG. 16, is energized to prevent effective operation of the stitching heads. Specifically, effective operation of the stitching heads under such circumstances is avoided by removing the wire W from between the gripper elements 164 and 165.

Figures 19, 20, 21:
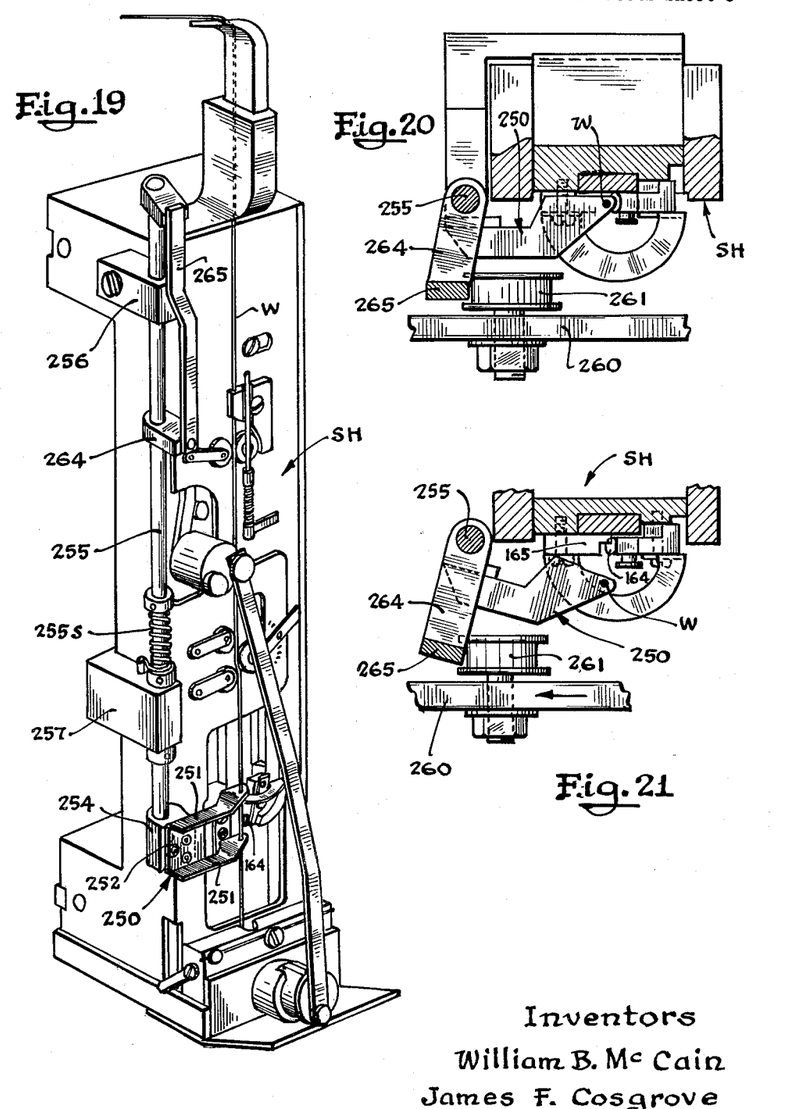
FIG. 19 is a perspective view of a stitching head equipped with a wire throw-out support yoke under the present invention.
FIGS. 20 and 21 are fragmentary sectional views showing the various positions of the wire throw-out yoke.

In accomplishing this result, the wire W for each stitching head is fed through a swingable guide 250, FIG. 19. The guide 250 is in the form of a yoke and includes a pair of arms 251 that are joined at one end by a plate 252. The arms 251 at the opposite ends are apertured as shown in FIG. 19, and the wire W is threaded therethrough.

The plate 252 is secured to a block 254 at the lower end of a vertically extending rock shaft 255 located in spaced supports 256 and 257 at one side of the gripper jaws 164 and 165. The yoke 250 is so related to the shaft 255 and the arms 251 are so configured that the wire W is vertically aligned with the bite between the gripper elements 164 and 165 so that in the normal position of the yoke 250, FIG. 20, the wire W is in position to be gripped and fed by the elements 164 and 165 in the manner described above. By turning the shaft 255 clockwise as viewed in FIG. 20, the yoke 250 will be swung or carried to the position shown in FIG. 21 whereat the wire W is displaced laterally from the feed jaw 164–165. This can be done by energizing solenoid 155A during the first half of the downstroke of the gripper elements 165–165 when the grippers are ordinarily effective to advance the wire for staple formation.

Thus, the solenoid 155A is arranged, when energized as above described, to apply a horizontal force to an actuating bar 260, FIGS. 16, 20 and 21. The bar 260 is provided with a plurality of rollers 261, as many as there are stitching heads to be controlled from a wire feed standpoint. In like manner, there are as many shafts 255 and related yokes 250 as there are stitching heads, and each shaft 255 is provided with a lug 264, FIG. 19, to which is fixed an upstanding pivot arm 265.

The upper end of each arm 265 is adjacent a roller 261. Specifically, each arm 265 is located on the solenoid-side of each roller 261. Normally, each shaft 255 is biased to a counterclockwise position when the wire W is presented to grippers 164 and 165 for a normal stitch feed, and this bias is exerted by a torsion spring 255S, FIG. 19, related to the shaft 255 in the usual fashion of a torsion spring.

When the solenoid 155A is energized, the bar 260 is pulled to the left as viewed in FIGS. 16 and 20. As a consequence, each roller 261 is forced against each related pivot arm 265, and the corresponding shaft 255 is rocked clockwise thereby as viewed in FIG. 20, shifting the yoke 250 to a non-wire feed position. When the solenoid 155A is de-energized, the springs as 255S are effective to return the wire positioning yokes or cradles 250 to the normal position illustrated in FIG. 20.

*Conclusion*

It will be seen from the foregoing that the present invention renders it possible to caliper signatures with a high degree of efficiency, and in particular to caliper under circumstances where the only significant indication will be page discrepancies. Moreover, the construction of the caliper apparatus is such that it can be adjusted to caliper closer to or farther from a selected edge of the signature groups, and can be readily and accurately synchronized to the time-rate of movement or lineal speed of the signature groups through the machine. Hence, while a preferred embodiment of the present invention has been illustrated and described, it will be appreciated that this is capable of variation and modification, and we therefore do not wish to be limited to the precise details set forth, but desire to avail ourselves of such changes and alterations as fall within the purview of the following claims.

We claim:

1. In a signature machine of the kind described wherein a predetermined number of signatures, gathered one atop another in a group, are to be moved along a conveyor path to a station where the signature group is to be joined by stitching means into a book, caliper apparatus for measuring each such signature group to determine if the thickness thereof departs on either the too thick or too thin side of that predetermined as corresponding to a book of correct thickness and comprising: a rotatable calipering cam and an opposed roller in alignment and between which the signature groups are to move prior to being joined, said cam having a fixed path of rotation, means for rotating said cam, said cam having a calipering segment rotatable past the roller, means supporting said roller for oscillating movement in opposite directions toward and away from said cam on either side of a datum position and comprising an oscillatable shaft and an arm of predetermined length secured thereto and serving to support said roller, means effective to exert a rotative bias on said shaft tending to move said roller out of the datum position in one of the opposite directions of oscillating movement thereof when a signature group departing on one side of correct thickness is in calipering position between the calipering segment and said roller, the calipering segment on said cam being effective to move said roller out of the datum position in the other of the opposite directions of oscillating movement thereof when a signature group departing on the other side of correct thickness is in calipering position between the calipering segment and the opposed roller, a control arm having a datum position corresponding to that for said roller, said control arm being secured to said shaft for oscillation therewith in opposite directions out of datum position and being of substantially greater length than the arm which supports said roller so as to move through multiples of the distance through which the roller may move out of datum position, and means for locating said roller in its datum position spaced from the calipering segment of the cam by a distance corresponding to said correct thickness except during a portion of the interval that the calipering segment is moving past said roller.

2. A machine according to claim 1 wherein the calipering cam and the opposed roller are arranged for selected shifting movement to adjusted positions along parallel axes to caliper at selected positions closer to or farther from a selected edge of the signature groups.

3. A machine according to claim 1 wherein means are afforded for moving the axis for the calipering cam to selected positions spaced from and parallel to the axis of the opposed roller, and wherein the signature groups are fed by feeder pins selectively positionable on a conveyor belt.

4. A machine according to claim 1 wherein the last-named means is a timing cam acting in opposition to the means which exert a rotative bias on the oscillatable shaft.

5. In a signature machine of the kind described wherein a predetermined number of signatures, gathered one atop another in a group, are to be moved along a conveyor path to a station where the signature group is to be joined by stitching means into a book, caliper apparatus for measuring each such signature group passing through the machine to determine if the thickness thereof departs on either the too thick or too thin side of that predetermined as corresponding to a book of correct thickness and comprising: a rotatable calipering cam and an opposed member in alignment therewith and between which a signature group is to be moved prior to being joined; said cam having a fixed axis of rotation; means for rotating said cam; said cam having a calipering segment thereon movable past the opposed member during an interval of the rotation of said cam; means yieldably urging the opposed member toward the calipering segment so that a signature group moving therebetween during calipering will be squeezed by the calipering segment and the opposed member, whereby the opposed member will occupy a position spaced from the calipering segment depending upon the thickness of the signature group thus squeezed; said means including an oscillatable shaft, an arm secured thereto which supports the opposed member, and yieldable means biasing the shaft to urge the opposed member as aforesaid; another arm secured to the shaft for movement therewith to different positions corresponding to the opposed member including a position indicative of thicknesses on either side of correct book thickness; said other arm being of greater length than the first-named arm; and means operated by said other arm in its different positions to control subsequent operations on the calipered signature group.

6. In a signature machine of the kind described wherein a predetermined number of signatures, gathered one atop another in a group, are to be moved along a conveyor path to a stitching station where the signature group is to be joined into a book, caliper apparatus for measuring each such signature group passing through the machine to determine if the thickness thereof departs on either the too thick or too thin side of that predetermined as corresponding to a book of correct thickness and comprising: a pair of aligned rollers between which a signature group is to be moved prior to being joined; one of said rollers having a fixed axis of rotation, means for yieldably urging the other of said rollers into a position close to said one roller to squeeze a signature group passing therebetween during calipering, whereby said other roller will occupy a position spaced from said one roller during calipering by a distance determined by the thickness of the signature group thus squeezed; said means including an oscillatable shaft, an arm secured thereto and which supports said other roller, and yieldable means biasing the shaft to urge said other roller as aforesaid; another arm secured to the shaft for movement therewith to different positions depending upon the thickness of the signature group being calipered, said other arm being of greater length than the first-named arm; and means operated by said other arm in its different positions to control subsequent operations on the calipered signature group.

7. In a signature machine of the kind described wherein a predetermined number of signatures, gathered one atop another in a group, are to be moved along an inclined saddle plate to a station where the signature group is to be joined by stitching means into a book: caliper apparatus at a calipering station for measuring each such signature group to determine if the thickness thereof departs on either the too thick or too thin side of that predetermined as corresponding to a book of correct thickness, said calipering station being defined by an opening in the saddle plate over which the signature groups move, and said calipering apparatus comprising: a rotatable calipering cam supported on a shaft on one side of the saddle plate and having an axis disposed parallel to the saddle plate, an opposed roller carried on a shaft on the other side of the saddle plate which shaft is parallel to the first-named shaft, said cam and roller being in alignment and between which the signature groups are to move prior to being joined, said cam and roller being movable to selected positions on their respective shafts to caliper at selected positions within said opening, the shaft for said cam being movable to selected positions toward and away from said roller, said cam having a calipering segment rotatable past the roller, means supporting said roller for oscillating movement in opposite directions toward and away from said cam on either side of a datum position and comprising an oscillatable shaft and an arm of predetermined length secured thereto and serving to support the shaft which carries said roller, a control arm having a datum position corresponding to that for said roller, said control arm being secured to said oscillatable shaft for oscillation therewith in opposite directions out of datum position and being of substantially greater length than the first-named arm so as to move through multiples of the distance through which the roller may move out of datum position, means effective to exert a rotative bias on said oscillatable shaft tending to move said roller out of the datum position in one of the opposite directions of oscillating movement thereof when a signature group departing on one side of correct thickness is in calipering position between the calipering segment and said roller, said biasing means including spring means acting on one of said arms, the calipering segment on said cam being effective to move said roller out of the datum position in the other of the opposite directions of oscillating movement thereof when a signature group departing on the other side of correct thickness is in calipering position between the calipering segment and the opposed roller, and a rotatable timing cam acting on one of said arms for locating said roller in its datum position spaced from the calipering segment of the calipering cam by a distance corresponding to said correct thickness except during a portion of the interval that the calipering segment is moving past said roller.

8. A machine according to claim 7 wherein the oscillatable shaft and the shaft which supports said calipering cam are supported by spaced bearings substantially eliminating backlash in said shafts.

9. In a signature machine of the kind described wherein a predetermined number of signatures, gathered one atop another in a group, are to be moved along an inclined saddle plate to a station where the signature group is to be joined by stitching means into a book, caliper apparatus as a calipering station for measuring each such signature group to determine if the thickness thereof departs on either the too thick or too thin side of that predetermined as corresponding to a book of correct thickness, said calipering apparatus comprising: a rotatable calipering cam and an opposed member between which the signature groups are to move prior to being joined, said cam having a calipering segment rotatable past the opposed member, means supporting said opposed member for oscillating movement in opposite directions toward and away from said cam on either side of a datum position and comprising an oscillatable shaft and an arm secured thereto and serving to support said opposed member, a control arm movable with said oscillatable shaft and having a datum position corresponding to that for said opposed member, means effective to exert a rotative bias on said oscillatable shaft tending to move said opposed member out of its datum position in one of the opposite directions of movement thereof when a signature departing on one side of correct thickness is in calipering position between the calipering segment and said opposed member, the calipering segment on said cam being effective to move said opposed member out of its datum position in the other of the opposite directions of movement thereof when a signature departing on the other side of correct thickness is in calipering position between the calipering segment and the opposed member, means under control of said control arm when it is not in datum position to govern operations in the machine, and a rotatable timing cam effective during an interval of rotation thereof to hold the opposed member in its datum position and effective during another interval of rotation thereof to free the opposed member for oscillating movement.

10. In a signature machine of the kind described wherein a predetermined number of signatures, gathered one atop another in a group, are to be moved along a conveyor path to a stitching station where the signature group is to be joined into a book; caliper apparatus for measuring each such signature group passing through the machine to determine if the thickness thereof departs on either the too thick or too thin side of that predetermined as corresponding to a book of correct thickness and comprising: a pair of aligned rollers between which a signature group is to be moved prior to being joined; one of said rollers having a fixed axis of rotation, means for yieldably urging the other of said rollers into a position close to said one roller to squeeze a signature group passing therebetween during calipering, whereby said other roller will occupy a position spaced from said one roller during calipering by a distance determined by the thickness of the signature group thus squeezed; said means including an oscillatable shaft, an arm secured thereto and which supports said other roller, and yieldable means biasing the shaft to urge said other roller as aforesaid; and another arm secured to the shaft for movement therewith to different positions depending upon the thickness of the signature group being calipered.

11. In a signature machine of the kind described wherein a predetermined number of signatures, gathered one atop another in a group, are to be moved along a conveyor path to a stitching station where the signature group is to be joined into a book, caliper apparatus for measuring each such signature group passing through the machine to determine if the thickness thereof departs on either the too thick or too thin side of that predetermined as corresponding to a book of correct thickness and comprising: a pair of aligned rollers between which a signature group is to be moved prior to being joined; one of said rollers having a fixed axis of rotation, means yieldably urging the other of said rollers into a position close to said one roller to contact opposite sides of a signature group passing therebetween during calipering, whereby said other roller will occupy a position spaced from said one roller during calipering by a distance determined by the thickness of the signature group thus contacted; said means including an oscillatable shaft, an arm secured thereto and which supports said other roller, another arm secured to the shaft for movement therewith to different positions depending upon the thickness of the signature group being calipered, spring means acting on said other arm tending to turn said oscillatable shaft; a timing cam acting on a follower carried by said other arm and having a dwell whereat said spring means is effective and a high part whereat said spring means is ineffective to turn said oscillatable shaft; and means operated by said other arm in its different positions to control subsequent operations on the calipered signature group.

References Cited by the Examiner
UNITED STATES PATENTS

| | | | |
|---|---|---|---|
| 1,252,011 | 1/18 | Maynard. | |
| 1,762,235 | 6/30 | Metcalf et al. | |
| 1,798,650 | 3/31 | Berlowitz | 33—148 |
| 2,268,521 | 12/41 | Wilson | 33—148 |
| 2,693,595 | 11/54 | Belluche et al. | |
| 2,999,242 | 9/61 | Young | 1—105 |

GRANVILLE Y. CUSTER, JR., *Primary Examiner.*